United States Patent [19]

Nagai

[11] Patent Number: 4,472,830
[45] Date of Patent: Sep. 18, 1984

[54] TELEVISION RECEIVER FOR DEMODULATING A TWO-LANGUAGE STEREO BROADCAST SIGNAL

[75] Inventor: Kunio Nagai, Kanagawa, Japan

[73] Assignee: Sony Corporation, Tokyo, Japan

[21] Appl. No.: 463,740

[22] Filed: Feb. 4, 1983

[30] Foreign Application Priority Data

Feb. 5, 1982 [JP] Japan .................................. 57-17332

[51] Int. Cl.³ .......................... H04H 5/00; H04N 5/40
[52] U.S. Cl. .......................................... 381/2; 358/144
[58] Field of Search ............................... 358/142–144, 358/198; 381/2, 27

[56] References Cited

U.S. PATENT DOCUMENTS

| | | | |
|---|---|---|---|
| 3,679,832 | 7/1972 | Halpern | 381/27 X |
| 4,139,866 | 2/1979 | Wegner | 358/198 |
| 4,302,837 | 11/1981 | Tanaka | 358/144 X |
| 4,405,834 | 9/1983 | Buhse et al. | 381/2 |
| 4,405,944 | 9/1983 | Eilers | 358/144 |

Primary Examiner—R. J. Hickey
Attorney, Agent, or Firm—Lewis H. Eslinger; Alvin Sinderbrand

[57] ABSTRACT

Apparatus for demodulating a multiplexed sound signal comprised of a first sound signal formed by the sum of a first channel signal and a second channel signal, a second sound signal formed by the difference of the first channel signal and the second channel signal, and a third sound signal formed by the sum of a third channel signal and a fourth channel signal, includes a pair of loudspeakers; a first switch device for supplying a monaural sound signal or a stereo sound signal to the loudspeakers; a matrix circuit for producing a first stereo sound signal in a first language or a second stereo sound signal in a second language in response to the second sound signal and the first sound signal or third sound signal, respectively, and for supplying the respective first stereo sound signal or the second stereo sound signal to the first switch device; and a second switch device for selectively supplying the first sound signal or the third sound signal to the matrix circuit or to the first switch device as a first monaural sound signal in the first language or as a second monaural sound signal in the second language, so that the loudspeakers can produce monaural sound in the first language, stereo sound in the first language, monaural sound in the second language or stereo sound in the second language.

11 Claims, 2 Drawing Figures

TELEVISION RECEIVER FOR DEMODULATING A TWO-LANGUAGE STEREO BROADCAST SIGNAL

BACKGROUND OF THE INVENTION

This invention relates generally to television receiving apparatus and, more particularly, is directed to a television receiving apparatus for reproducing a sound broadcast in two languages.

In many cases, it is desirable to produce a television broadcast in different languages. This is particularly important in a country in which, for example, two languages are spoken. For example, in a country in which English and Spanish are spoken, it may be desirable to reproduce a television broadcast of a football game in either the English language or the Spanish language.

In accordance with one proposal, a television receiver is provided for reproducing monaural sound in either of the two languages in a two language broadcast. It is also known, for example, in Japan to produce a stereo broadcast. However, the stereo broadcast is in a single language, for example, the Japanese language. It sometimes becomes desirable, however, to reproduce stereo sound in either of two languages in a two language broadcast.

OBJECTS AND SUMMARY OF THE INVENTION

Accordingly, it is an object of this invention to provide apparatus for demodulating a multiplexed sound signal that avoids the above-described difficulties encountered with the aforementioned proposed systems.

More particularly, it is an object of this invention to provide apparatus for demodulating a multiplexed sound signal to provide stereo reproduction in either of two languages in a two language broadcast.

In accordance with an aspect of this invention, apparatus for demodulating a multiplexed sound signal comprised of a first sound signal formed by the sum of a first channel signal and a second channel signal, a second sound signal formed by the difference of the first channel signal and the second channel signal, and a third sound signal formed by the sum of a third channel signal and a fourth channel signal, includes sound output means; first switch means for supplying one of a monaural sound signal and stereo sound signal to the sound output means; matrix means for producing one of a first stereo sound signal and a second stereo sound signal in response to the second sound signal and one of the first sound signal and the third sound signal, respectively, and for supplying one of the first stereo sound signal and the second stereo sound signal to the first switch means; and second switch means for selectively supplying one of the first sound signal and the third sound signal to one of the matrix means and the first switch means.

The above, and other, objects, features and advantages of the present invention will become readily apparent in the following detailed description of an illustrative embodiment thereof which is to be read in connection with the accompanying drawings.

DETAILED DESCRIPTION OF A PREFERRED EMBODIMENT

Figure 1:
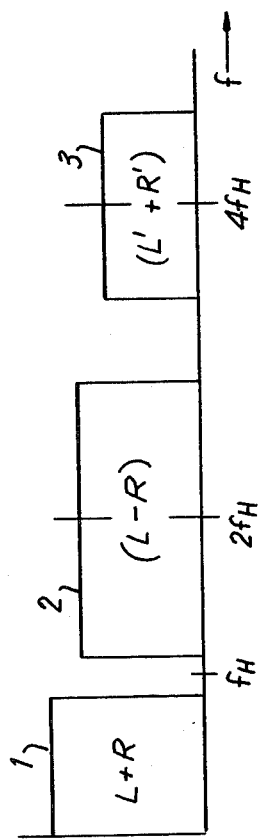
FIG. 1 is a schematic diagram illustrating the frequency spectrum of the different signals transmitted during a two language broadcast.

Referring to the drawings in detail, and initially to FIG. 1 thereof, there is shown therein the frequency spectrum of a proposed multiplexed sound broadcast signal comprised of a first main signal 1 formed by the sum (L+R) of a first-language left channel signal L and right channel signal R. For example, the first language may be the English-language, and hereinafter, for ease in understanding the invention, the first language will be referred to as the English language. The multiplexed sound broadcast signal also includes a second sound sub-signal 2 formed by frequency modulating (FM) or amplitude modulating (AM) a carrier having a frequency twice that of the horizontal deflection frequency $f_H$ with the difference (L−R) of the English-language left channel signal L and right channel signal R. The multiplexed sound broadcast signal also includes a third sound signal 3 corresponding to a transmitted second language. Third sound signal 3 is formed by frequency modulating a carrier having a frequency $4f_H$ by the sum (L'+R') of a second language left channel signal L' and a second language right channel signal R'. For example, the second language may be the Spanish language, and hereinafter, for ease in understanding the invention, the second language will be referred to as the Spanish language. It is to be appreciated that it is only necessary that the modulated carrier of the third sound signal 3 have a frequency band which does not interfere with that of second sub-sound signal 2, that is, the carrier may have a frequency of $4.5f_H$, $5f_H$ or the like.

Figure 2:
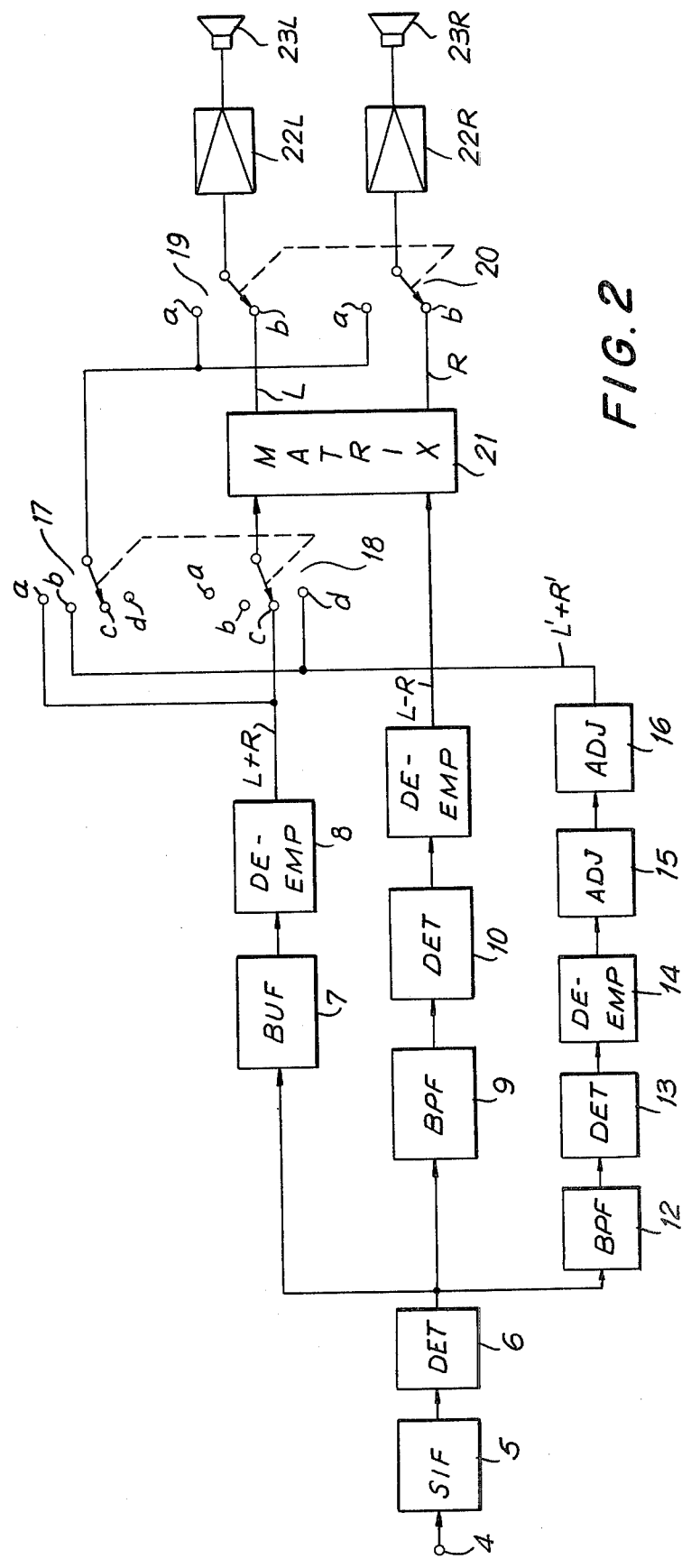
FIG. 2 is a block diagram of apparatus for demodulating a multiplexed sound signal according to one embodiment of the present invention.

In accordance with the present invention, the multiplexed sound broadcast signal comprised of sound signals 1, 2 and 3 can be demodulated to provide monaural sound in the English language, stereo sound in the English language, monaural sound in the Spanish language or stereo sound in the Spanish language. Thus, for example, when a football game is broadcast in stereo in the English language, and also in a second language, such as Spanish, the present invention provides for the separate stereo or monaural listening of the English language broadcast or Spanish language broadcast, without the other broadcast being heard. More particularly, apparatus for demodulating a multiplexed sound broadcast signal according to one embodiment of the present invention will now be described with respect to FIG. 2. As shown therein, a color television signal is supplied from an input 4 to a sound intermediate frequency (SIF) amplifier 5 which separates a sound intermediate frequency (SIF) signal therefrom. The SIF signal is supplied to a sound signal detector 6 which may include an FM demodulator from which the multiplexed sound broadcast signal shown in FIG. 1 is obtained.

The multiplexed sound broadcast signal from sound signal detector 6 is supplied to a buffer circuit 7 and de-emphasis circuit 8 which separates the first main sound signal or sum signal (L+R) therefrom and which is supplied to input contacts a and c of switch circuits 17 and 18, respectively. The multiplexed sound broadcast signal from detector 6 is also supplied through a band pass filter (BPF) 9 having a center frequency equal to the carrier frequency $2f_H$ of second sound sub-signal 2 for separating second sound sub-signal 2 having a frequency band centered about the frequency $2f_H$ The output of BPF 9 is then supplied to a sound signal detector 10 where it is FM or AM demodulated and then supplied through a de-emphasis circuit 11 which produces the difference signal (L−R) and supplies the same to one input of a matrix circuit 21.

For separating third sound signal 3 from the multiplexed sound broadcast signal, the output from detector 6 is supplied to a band pass filter (BPF) 12 having a center frequency of, for example, $4f_H$ for separating third sound signal 3 from the multiplexed sound broadcast signal. Third sound signal 3 from BPF 12 is supplied to a sound signal detector 13 where it is FM demodulated and the output therefrom is supplied through a de-emphasis circuit 14 for producing the sum signal (L'+R'). The sum signal (L'+R') is then supplied to a level adjusting circuit 15 and phase adjusting circuit 16 to adjust the level and phase of sum signal (L'+R') so that the latter level and phase correspond to those of difference signal (L−R). The adjusted sum signal (L'+R') is then supplied to input contacts b and d of switch circuits 17 and 18, respectively. Switch circuits 17 and 18 each include an arm movable between input contacts a–d thereof and which are ganged so as to connect the same respective input contacts a–d. It is to be appreciated that input contact c and d of switch circuit 17 and input contacts a and b of switch circuit 18 are not supplied with any signal.

Switch circuits 19 and 20 are also provided, each including a monaural input contact a, and a stereo input contact b and an arm movable between input contacts a and b thereof. Switch circuit 19 is connected to a loudspeaker 23L through an amplifier 22L for supplying a monaural sound signal or the left channel signal of a stereo signal thereto. In like manner, switch circuit 20 is connected to a loudspeaker 23R through an amplifier 22R for supplying either the same monaural sound signal or the right channel signal of a stereo signal thereto.

More particularly, when the movable arms of switch circuits 17 and 18 are connected to input contacts a, sum signal (L +R) from de-emphasis circuit 8 is supplied through switch circuit 17 to input contacts a of switch circuits 19 and 20. At such time, the movable arms of switch circuits 19 and 20 are connected to monaural input contacts a. As a result, monaural sound is produced in the first or English language by each of loudspeakers 23L and 23R. When switch circuits 17 and 18 are connected to input contacts b, the sum signal (L'+R') is supplied through switch circuit 17 to monaural input contacts a of switch circuits 19 and 20, the movable arms of which are also connected to monaural input contacts a thereof. As a result, monaural sound in the second or Spanish language is produced by loudspeakers 23L and 23R.

On the other hand, when the movable arms of switch circuits 17 and 18 are connected to input contacts c thereof, the movable arms of switch circuits 19 and 20 are connected to stereo input contacts b thereof. As a result, the first sum signal (L+R) is supplied through switch circuit 18 to matrix circuit 21, along with difference signal (L−R). In response thereto, matrix circuit 21 supplies an English-language left channel sound signal L supplied through switch circuit 19 to loudspeaker 23L which produces a left channel sound and supplies an English-language right channel sound signal R through switch circuit 20 to loudspeaker 23R which produces a right channel sound in the first or English language. As an example, if l represents background sounds, for example, music, the crowd at a football game or the like, from the left channel, r represents background sounds from the right channel and s represents a voice in the English language, then:

$$L = l + s \quad (1),$$

$$R = r + s \quad (2).$$

In order to produce only the left channel sound signal L and right channel sound signal R, matrix circuit 21 performs the following operations:

$$(L+R)+(L-R)=2L=2l+2s \quad (3),$$

$$(L+R)-(L-R)=2R=2r+2s \quad (4).$$

In this manner, stereo sound in the English language is produced by loudspeakers 23L and 23R.

When the movable arms of switch circuits 17 and 18 are connected to input contacts d, the movable arms of switch circuits 19 and 20 are connected to stereo input contacts b thereof. In this manner, sum signal (L'+R') and difference signal (L−R) are both supplied to matrix circuit 21. In response thereto, matrix circuit 21 produces a left channel sound signal L' in the second or Spanish language which is supplied through switch circuit 19 to loudspeaker 23L for reproduction as a left channel sound in the Spanish language, and produces a right channel sound signal R' in the Spanish lanugage which is supplied through switch circuit 20 to loudspeaker 23R for reproduction as a right channel sound in the Spanish language. More particularly, if, as aforementioned, l represents left channel background sounds, r represents right channel background sounds, and s' represents a voice in the second language, for example, a Spanish language announcement at a football game, then:

$$L' = l + s' \quad (5),$$

$$R' = r + s' \quad (6).$$

In this manner, matrix circuit 21 forms the left channel sound signal L' and right channel sound signal R' in the second language as follows:

$$(L' + R') + (L - R) = (l + r + 2s') + (l - r) \quad (7)$$
$$= 2l + 2s' = 2L',$$

$$(L' + R') - (L - R) = (l + r + 2s') - (l - r) \quad (8)$$
$$= 2r + 2s' = 2R'.$$

It is to be appreciated that, the signal level of the voice s in sum signal (L+R) is substantially the same for the left channel sound signal L and right channel sound signal R. Accordingly, the English language voice cancels in the difference signal (L−R) so that there are substantially no voice sounds in the stereo difference signal (L−R). In this manner, when sum signal (L+R) and difference signal (L−R) are mixed in matrix circuit 21, announcement of, for example, a football game in the English language can be easily obtained. Further, since no English-language voices are present in the stereo difference signal (L−R), that is, after cancellation, only background sounds are present, production of stereo sound in the second or Spanish language can also be obtained. In this manner, the user can enjoy stereo sound in either of two languages.

In order to properly mix difference signal (L−R) and sum signal (L′+R′) in matrix circuit 21, level adjustment between the two signals is performed in level adjusting circuit 15 and the phases of the two signals are synchronized by phase adjusting circuit 16. Such adjustments are performed while listening to the sounds from loudspeakers 23L and 23R.

It is to be appreciated that various modifications can be readily made by one of ordinary skill in the art within the scope of this invention. For example, the multiplexed sound broadcast signal may include pilot signals for automatically controlling the operation of switch circuits 17, 18, 19 and 20. Further, instead of sum signal (L+R) and difference signal (L−R), a sum signal (L+R) and a second signal (2R) can be used in place thereof. In such case, the stereo difference signal (L−R) can be obtained by subtracting the second signal (2R) from the sum signal (L+R), that is, (L+R)−(2R)=(L−R). Then, left and right channel sound signals L and R in the first language and left and right channel sound signals L′ and R′ in the second language can be readily formed by matrix circuit 21 in accordance with equations (3)-(8). It is to be further appreciated that semiconductor devices can be used in place of mechanical switches 17, 18, 19 and 20.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for demodulating a multiplexed sound signal comprised of a first sound signal formed by the sum of a first channel signal and a second channel signal, a second sound signal formed by the difference of said first channel signal and said second channel signal, and a third sound signal formed by the sum of a third channel signal and a fourth channel signal, comprising:
    sound output means;
    matrix means for producing one of a first stereo sound signal and a second stereo sound signal in response to said second sound signal and one of said first sound signal and said third sound signal, respectively, and for supplying one of said first stereo sound signal and said second stereo sound signal to said sound output means; and
    means for supplying said second sound signal to said matrix means;
    first switch means for selectively supplying one of said first sound signal and said third sound signal to said matrix means.

2. Apparatus according to claim 1; further including second switch means for supplying one of a stereo sound signal from said matrix means and a monaural sound signal to said sound output means and including monaural input means; and in which said first switch means includes a first input for supplying said first sound signal to said monaural input means of said second switch means to produce a first monaural sound signal and a second input for supplying said third sound signal to said monaural input means of said second switch means to produce a second monaural sound signal.

3. Apparatus according to claim 1; in which said first switch means includes a first input for supplying said first sound signal to said matrix means and a second input for supplying said third sound signal to said matrix means.

4. Apparatus according to claim 3; further including second switch means having a first stereo input and a second stereo input; and in which said first and second stereo sound signals each include a left channel sound signal and a right channel sound signal; and said matrix means supplies a left channel sound signal of one of said first and second stereo sound signals to said first stereo input and supplies a right channel sound signal of said one of said first and second stereo sound signals to said second stereo input.

5. Apparatus according to claim 4; in which said matrix means produces said left channel sound signal of said first and second stereo sound signals by adding said second sound signal and one of said first and third sound signals, respectively, and produces said right channel sound signal of said first and second stereo sound signals by subtracting said second sound signal from said one of said first and third sound signals, respectively.

6. Apparatus according to claim 1; further including means for producing said first sound signal in response to said multiplexed sound signal including a series combination of buffer means and de-emphasis means supplied with said multiplexed sound signal.

7. Apparatus according to claim 1; further including means for producing said second sound signal in response to said multiplexed sound signal including a series combination of detector means and de-emphasis means supplied with said multiplexed sound signal.

8. Apparatus according to claim 1; further including means for producing said third sound signal in response to said multiplexed sound signal including a series combination of detector means and de-emphasis means supplied with said multiplexed sound signal.

9. Apparatus according to claim 8; in which said means for producing said third sound signal in response to said multiplexed sound signal further includes adjusting means for adjusting the level and phase of said third sound signal with respect to the level and phase of said second sound signal.

10. Apparatus according to claim 1; in which said sound output means includes loudspeaker means for producing one of monaural sound and stereo sound in response to one of a monaural sound signal and stereo sound signal, respectively, supplied thereto.

11. Apparatus for demodulating a multiplexed sound signal comprised of a first sound signal formed by the sum of a first channel signal and a second channel, a second sound signal formed by the difference of said first channel signal and said second channel signal, and a third sound signal formed by the sum of a third channel signal and a fourth channel signal, comprising:
    sound output means;
    first switch means for supplying one of a monaural sound signal and a stereo sound signal to said sound output means;
    matrix means for producing one of a first stereo sound signal and a second stereo sound signal in response to said second sound signal and one of said first sound signal and said third sound signal, respectively, and for supplying one of said first stereo sound signal and said second stereo sound signal to said first switch means; and
    second switch means for selectively supplying one of said first sound signal and said third sound signal to one of said matrix means and said first switch means.

* * * * *